United States Patent
Albat

(10) Patent No.: US 9,128,929 B2
(45) Date of Patent: Sep. 8, 2015

(54) SYSTEMS AND METHODS FOR AUTOMATICALLY ESTIMATING A TRANSLATION TIME INCLUDING PREPARATION TIME IN ADDITION TO THE TRANSLATION ITSELF

(75) Inventor: Thomas Fritz Albat, Marbach (DE)

(73) Assignee: SDL Language Technologies, Los Angeles, CA (US)

(*) Notice: Subject to any disclaimer, the term of this patent is extended or adjusted under 35 U.S.C. 154(b) by 559 days.

(21) Appl. No.: 13/007,460

(22) Filed: Jan. 14, 2011

(65) Prior Publication Data

US 2012/0185235 A1 Jul. 19, 2012

(51) Int. Cl.
  *G06F 17/28* (2006.01)
  *G10L 21/00* (2013.01)
  *G06Q 10/00* (2012.01)
  *G06Q 10/06* (2012.01)

(52) U.S. Cl.
  CPC ...... *G06F 17/289* (2013.01); *G06Q 10/063118* (2013.01)

(58) Field of Classification Search
  CPC .............. G06F 17/289; G06Q 10/063118
  USPC ............................. 704/2, 3, 8, 277
  See application file for complete search history.

(56) References Cited

U.S. PATENT DOCUMENTS

| | | | |
|---|---|---|---|
| 4,661,924 A | 4/1987 | Okamoto et al. | |
| 4,674,044 A | 6/1987 | Kalmus et al. | |
| 4,677,552 A | 6/1987 | Sibley, Jr. | |
| 4,789,928 A | 12/1988 | Fujisaki | |
| 4,903,201 A | 2/1990 | Wagner | |
| 4,916,614 A | 4/1990 | Kaji et al. | |
| 4,962,452 A | 10/1990 | Nogami et al. | |
| 4,992,940 A | 2/1991 | Dworkin | |

(Continued)

FOREIGN PATENT DOCUMENTS

AU 199938259 11/1999
AU 761311 9/2003

(Continued)

OTHER PUBLICATIONS

Komatsu, H et al, "Corpus-based predictive text input", "Proceedings of the 2005 International Conference on Active Media Technology", 2005, IEEE, pp. 75-80, ISBN 0-7803-9035-0.

(Continued)

*Primary Examiner* — Farzad Kazeminezhad
(74) *Attorney, Agent, or Firm* — Carr & Ferrell LLP

(57) ABSTRACT

A method for automatically estimating a translation time comprises receiving translation data, determining one or more translation parameters based on the translation data, retrieving one or more pre-determined translation coefficients associated with the one or more translation parameters, calculating an estimated translation time based on the one more or more translation parameters and the one or more pre-determined translation coefficients, and a base time to prepare the translation in addition to the translation itself. The method may further comprise reporting the estimated translation time to a user, receiving, from the user, a request to perform a translation associated with the translation data, performing the translation, recording an actual translation time, comparing the actual translation time to the estimated translation time, and based on the comparison, revising the one or more pre-determined translation coefficients to improve the estimating of the translation time.

17 Claims, 9 Drawing Sheets

(56) References Cited

U.S. PATENT DOCUMENTS

| | | | |
|---|---|---|---|
| 5,005,127 | A | 4/1991 | Kugimiya et al. |
| 5,020,021 | A | 5/1991 | Kaji et al. |
| 5,075,850 | A | 12/1991 | Asahioka et al. |
| 5,093,788 | A | 3/1992 | Shiotani et al. |
| 5,111,398 | A | 5/1992 | Nunberg et al. |
| 5,140,522 | A | 8/1992 | Ito et al. |
| 5,146,405 | A | 9/1992 | Church |
| 5,168,446 | A | 12/1992 | Wiseman |
| 5,224,040 | A | 6/1993 | Tou |
| 5,243,515 | A | 9/1993 | Lee |
| 5,243,520 | A | 9/1993 | Jacobs et al. |
| 5,283,731 | A | 2/1994 | Lalonde et al. |
| 5,295,068 | A | 3/1994 | Nishino et al. |
| 5,301,109 | A | 4/1994 | Landauer et al. |
| 5,325,298 | A | 6/1994 | Gallant |
| 5,349,368 | A | 9/1994 | Takeda et al. |
| 5,408,410 | A | 4/1995 | Kaji |
| 5,418,717 | A | 5/1995 | Su et al. |
| 5,423,032 | A | 6/1995 | Byrd et al. |
| 5,477,451 | A | 12/1995 | Brown et al. |
| 5,490,061 | A | 2/1996 | Tolin et al. |
| 5,497,319 | A | 3/1996 | Chong et al. |
| 5,510,981 | A | 4/1996 | Berger et al. |
| 5,541,836 | A | 7/1996 | Church et al. |
| 5,548,508 | A | 8/1996 | Nagami |
| 5,555,343 | A | 9/1996 | Luther |
| 5,587,902 | A | 12/1996 | Kugimiya |
| 5,640,575 | A | 6/1997 | Maruyama et al. |
| 5,642,522 | A | 6/1997 | Zaenen et al. |
| 5,644,775 | A | 7/1997 | Thompson et al. |
| 5,687,384 | A | 11/1997 | Nagase |
| 5,708,825 | A | 1/1998 | Sotomayor |
| 5,710,562 | A | 1/1998 | Gormish et al. |
| 5,715,402 | A | 2/1998 | Popolo |
| 5,724,593 | A | 3/1998 | Hargrave, III et al. |
| 5,751,957 | A | 5/1998 | Hiroya et al. |
| 5,764,906 | A | 6/1998 | Edelstein et al. |
| 5,765,138 | A | 6/1998 | Aycock et al. |
| 5,794,219 | A | 8/1998 | Brown |
| 5,799,269 | A | 8/1998 | Schabes et al. |
| 5,802,502 | A | 9/1998 | Gell et al. |
| 5,818,914 | A | 10/1998 | Fujisaki |
| 5,819,265 | A | 10/1998 | Ravin et al. |
| 5,826,244 | A | 10/1998 | Huberman |
| 5,842,204 | A | 11/1998 | Andrews et al. |
| 5,844,798 | A | 12/1998 | Uramoto |
| 5,845,143 | A | 12/1998 | Yamauchi et al. |
| 5,845,306 | A | 12/1998 | Schabes et al. |
| 5,848,386 | A | 12/1998 | Motoyama |
| 5,850,442 | A | 12/1998 | Muftic |
| 5,850,561 | A | 12/1998 | Church et al. |
| 5,864,788 | A | 1/1999 | Kutsumi |
| 5,884,246 | A | 3/1999 | Boucher et al. |
| 5,895,446 | A | 4/1999 | Takeda et al. |
| 5,917,484 | A | 6/1999 | Mullaney |
| 5,950,194 | A | 9/1999 | Bennett et al. |
| 5,956,711 | A | 9/1999 | Sullivan et al. |
| 5,956,740 | A | 9/1999 | Nosohara |
| 5,960,382 | A | 9/1999 | Steiner |
| 5,966,685 | A | 10/1999 | Flanagan et al. |
| 5,974,371 | A | 10/1999 | Hirai et al. |
| 5,974,413 | A | 10/1999 | Beauregard et al. |
| 5,987,401 | A | 11/1999 | Trudeau |
| 5,987,403 | A | 11/1999 | Sugimura |
| 6,044,363 | A | 3/2000 | Mori et al. |
| 6,047,299 | A | 4/2000 | Kaijima |
| 6,070,138 | A | 5/2000 | Iwata |
| 6,092,034 | A | 7/2000 | McCarley et al. |
| 6,092,035 | A | 7/2000 | Kurachi et al. |
| 6,131,082 | A | 10/2000 | Hargrave, III et al. |
| 6,139,201 | A | 10/2000 | Carbonell et al. |
| 6,154,720 | A | 11/2000 | Onishi et al. |
| 6,161,082 | A | 12/2000 | Goldberg et al. |
| 6,163,785 | A | 12/2000 | Carbonell et al. |
| 6,260,008 | B1 | 7/2001 | Sanfilippo |
| 6,278,969 | B1 | 8/2001 | King et al. |
| 6,285,978 | B1 | 9/2001 | Bernth et al. |
| 6,301,574 | B1 | 10/2001 | Thomas et al. |
| 6,304,846 | B1 | 10/2001 | George et al. |
| 6,338,033 | B1 | 1/2002 | Bourbonnais et al. |
| 6,341,372 | B1 | 1/2002 | Datig |
| 6,345,244 | B1 | 2/2002 | Clark |
| 6,345,245 | B1 | 2/2002 | Sugiyama et al. |
| 6,347,316 | B1 | 2/2002 | Redpath |
| 6,353,824 | B1 | 3/2002 | Boguraev et al. |
| 6,385,568 | B1 | 5/2002 | Brandon et al. |
| 6,393,389 | B1 | 5/2002 | Chanod et al. |
| 6,401,105 | B1 | 6/2002 | Carlin et al. |
| 6,442,524 | B1 | 8/2002 | Ecker et al. |
| 6,470,306 | B1 | 10/2002 | Pringle et al. |
| 6,473,729 | B1 | 10/2002 | Gastaldo et al. |
| 6,526,426 | B1 | 2/2003 | Lakritz |
| 6,622,121 | B1 | 9/2003 | Crepy et al. |
| 6,623,529 | B1 | 9/2003 | Lakritz |
| 6,658,627 | B1 | 12/2003 | Gallup et al. |
| 6,687,671 | B2 | 2/2004 | Gudorf et al. |
| 6,731,625 | B1 | 5/2004 | Eastep et al. |
| 6,782,384 | B2 | 8/2004 | Sloan et al. |
| 6,952,691 | B2 | 10/2005 | Drissi et al. |
| 6,993,473 | B2 | 1/2006 | Cartus |
| 7,020,601 | B1 | 3/2006 | Hummel et al. |
| 7,100,117 | B1 | 8/2006 | Chwa et al. |
| 7,110,938 | B1 | 9/2006 | Cheng et al. |
| 7,185,276 | B2 | 2/2007 | Keswa |
| 7,194,403 | B2 | 3/2007 | Okura et al. |
| 7,209,875 | B2 | 4/2007 | Quirk et al. |
| 7,266,767 | B2 | 9/2007 | Parker |
| 7,343,551 | B1 | 3/2008 | Bourdev |
| 7,353,165 | B2 | 4/2008 | Zhou et al. |
| 7,533,338 | B2 | 5/2009 | Duncan et al. |
| 7,580,960 | B2 | 8/2009 | Travieso et al. |
| 7,587,307 | B2 | 9/2009 | Cancedda et al. |
| 7,594,176 | B1 | 9/2009 | English |
| 7,596,606 | B2 | 9/2009 | Codignotto |
| 7,640,158 | B2 | 12/2009 | Detlef et al. |
| 7,693,717 | B2 | 4/2010 | Kahn et al. |
| 7,698,124 | B2 | 4/2010 | Menezes et al. |
| 7,925,494 | B2 | 4/2011 | Cheng et al. |
| 7,983,896 | B2 | 7/2011 | Ross et al. |
| 8,050,906 | B1 | 11/2011 | Zimmerman et al. |
| 8,521,506 | B2 | 8/2013 | Lancaster et al. |
| 8,620,793 | B2 | 12/2013 | Knyphausen et al. |
| 8,935,148 | B2 | 1/2015 | Christ |
| 8,935,150 | B2 | 1/2015 | Christ |
| 2002/0002461 | A1 | 1/2002 | Tetsumoto |
| 2002/0093416 | A1 | 7/2002 | Goers et al. |
| 2002/0099547 | A1 | 7/2002 | Chu et al. |
| 2002/0103632 | A1* | 8/2002 | Dutta et al. .................. 704/2 |
| 2002/0110248 | A1 | 8/2002 | Kovales et al. |
| 2002/0111787 | A1 | 8/2002 | Knyphausen et al. |
| 2002/0138250 | A1 | 9/2002 | Okura et al. |
| 2002/0165708 | A1 | 11/2002 | Kumhyr |
| 2002/0169592 | A1 | 11/2002 | Aityan |
| 2002/0198701 | A1 | 12/2002 | Moore |
| 2003/0004702 | A1 | 1/2003 | Higinbotham |
| 2003/0016147 | A1* | 1/2003 | Evans .................... 340/988 |
| 2003/0040900 | A1* | 2/2003 | D'Agostini ................ 704/2 |
| 2003/0069879 | A1 | 4/2003 | Sloan et al. |
| 2003/0078766 | A1 | 4/2003 | Appelt et al. |
| 2003/0105621 | A1 | 6/2003 | Mercier |
| 2003/0120479 | A1 | 6/2003 | Parkinson et al. |
| 2003/0158723 | A1 | 8/2003 | Masuichi et al. |
| 2003/0182279 | A1 | 9/2003 | Willows |
| 2003/0194080 | A1 | 10/2003 | Michaelis et al. |
| 2003/0229622 | A1 | 12/2003 | Middelfart |
| 2003/0233222 | A1 | 12/2003 | Soricut et al. |
| 2004/0122656 | A1 | 6/2004 | Abir |
| 2004/0172235 | A1 | 9/2004 | Pinkham et al. |
| 2005/0021323 | A1 | 1/2005 | Li |
| 2005/0055212 | A1 | 3/2005 | Nagao |
| 2005/0075858 | A1 | 4/2005 | Pournasseh et al. |
| 2005/0094475 | A1 | 5/2005 | Naoi |
| 2005/0171758 | A1 | 8/2005 | Palmquist |
| 2005/0197827 | A1 | 9/2005 | Ross et al. |

(56) References Cited

U.S. PATENT DOCUMENTS

| | | |
|---|---|---|
| 2005/0222837 A1 | 10/2005 | Deane |
| 2005/0222973 A1 | 10/2005 | Kaiser |
| 2005/0273314 A1 | 12/2005 | Chang et al. |
| 2006/0015320 A1 | 1/2006 | Och |
| 2006/0095848 A1 | 5/2006 | Naik |
| 2006/0136277 A1* | 6/2006 | Perry .................................. 705/8 |
| 2006/0256139 A1 | 11/2006 | Gikandi |
| 2006/0287844 A1 | 12/2006 | Rich |
| 2007/0118378 A1 | 5/2007 | Skuratovsky |
| 2007/0136470 A1 | 6/2007 | Chikkareddy et al. |
| 2007/0150257 A1 | 6/2007 | Cancedda et al. |
| 2007/0192110 A1* | 8/2007 | Mizutani et al. ............. 704/277 |
| 2007/0230729 A1 | 10/2007 | Naylor et al. |
| 2007/0233460 A1 | 10/2007 | Lancaster et al. |
| 2007/0233463 A1 | 10/2007 | Sparre |
| 2007/0244702 A1 | 10/2007 | Kahn et al. |
| 2007/0294076 A1 | 12/2007 | Shore et al. |
| 2008/0077395 A1 | 3/2008 | Lancaster et al. |
| 2008/0141180 A1 | 6/2008 | Reed et al. |
| 2008/0147378 A1 | 6/2008 | Hall |
| 2008/0243834 A1 | 10/2008 | Rieman et al. |
| 2008/0294982 A1 | 11/2008 | Leung et al. |
| 2009/0132230 A1* | 5/2009 | Kanevsky et al. ................ 704/2 |
| 2009/0187577 A1 | 7/2009 | Reznik et al. |
| 2009/0204385 A1 | 8/2009 | Cheng et al. |
| 2009/0248182 A1 | 10/2009 | Logan et al. |
| 2009/0248482 A1 | 10/2009 | Knyphausen et al. |
| 2009/0326917 A1 | 12/2009 | Hegenberger |
| 2010/0223047 A1 | 9/2010 | Christ |
| 2010/0241482 A1 | 9/2010 | Knyphausen et al. |
| 2010/0262621 A1 | 10/2010 | Ross et al. |
| 2011/0184719 A1 | 7/2011 | Christ |
| 2012/0046934 A1 | 2/2012 | Cheng et al. |
| 2012/0095747 A1 | 4/2012 | Ross et al. |
| 2013/0346062 A1 | 12/2013 | Lancaster et al. |
| 2014/0006006 A1 | 1/2014 | Christ |
| 2014/0012565 A1 | 1/2014 | Lancaster et al. |

FOREIGN PATENT DOCUMENTS

| | | |
|---|---|---|
| BE | 1076861 | 6/2005 |
| CA | 231184 | 7/2009 |
| CH | 1076861 | 6/2005 |
| CN | ZL99808249.X | 12/2004 |
| CN | 1770144 | 5/2006 |
| CN | 101019113 | 8/2007 |
| CN | 101826072 | 9/2010 |
| CN | ZL200680015388.6 | 10/2010 |
| CN | 102053958 | 5/2011 |
| DE | 69925831 | 6/2005 |
| DE | 2317447 | 1/2014 |
| EP | 0262938 | 4/1988 |
| EP | 0668558 | 8/1995 |
| EP | 0887748 | 12/1998 |
| EP | 1076861 | 11/1999 |
| EP | 1266313 | 12/2002 |
| EP | 1076861 | 6/2005 |
| EP | 18787221 | 5/2007 |
| EP | 1889149 | 2/2008 |
| EP | 2226733 | 9/2010 |
| EP | 2317447 | 5/2011 |
| EP | 2336899 | 6/2011 |
| EP | 2317447 | 1/2014 |
| FR | 1076861 | 6/2005 |
| GB | 2317447 | 1/2004 |
| GB | 1076861 | 6/2005 |
| GB | 2433403 | 6/2007 |
| GB | 2468278 | 9/2010 |
| GB | 2474839 | 5/2011 |
| IE | 1076861 | 6/2005 |
| JP | 04152466 | 5/1992 |
| JP | 05135095 | 6/1993 |
| JP | 05197746 | 8/1993 |
| JP | 06035962 | 2/1994 |
| JP | 06259487 | 9/1994 |
| JP | 07093331 A2 | 4/1995 |
| JP | 08055123 | 2/1996 |
| JP | 9114907 | 5/1997 |
| JP | 10063747 | 3/1998 |
| JP | 10097530 | 4/1998 |
| JP | 2002513970 | 5/2002 |
| JP | 2003150623 | 5/2003 |
| JP | 2004318510 | 11/2004 |
| JP | 2005107597 | 4/2005 |
| JP | 2005197827 | 7/2005 |
| JP | 2007249606 | 9/2007 |
| JP | 2008152670 | 7/2008 |
| JP | 2008152760 | 7/2008 |
| JP | 4718687 | 4/2011 |
| JP | 2011095841 | 5/2011 |
| MX | 244945 | 4/2007 |
| NL | 2317447 | 1/2014 |
| WO | WO9406086 | 3/1994 |
| WO | WO9957651 | 11/1999 |
| WO | WO0057320 | 9/2000 |
| WO | WO0101289 | 1/2001 |
| WO | WO0129696 | 4/2001 |
| WO | WO0229622 | 4/2002 |
| WO | WO2006016171 | 2/2006 |
| WO | WO2006121849 | 11/2006 |
| WO | WO2008055360 | 5/2008 |
| WO | WO2008083503 | 7/2008 |
| WO | WO2008147647 | 12/2008 |

OTHER PUBLICATIONS

Saiz, Jorge Civera: "Novel statistical approaches to text classification, machine translation and computer-assisted translation" Doctor En Informatica Thesis, May 22, 2008, XP002575820 Universidad Polit'ecnica de Valencia, Spain. Retrieved from Internet: http://dspace.upv.es/manakin/handle/10251/2502 [retrieved on Mar. 30, 2010]. p. 111-131.

De Gispert, A., Marino, J.B. and Crego, J.M.: "Phrase-Based Alignment Combining Corpus Cooccurrences and Linguistic Knowledge" Proc. of the Int. Workshop on Spoken Language Translation (IWSLT'04), Oct. 1, 2004, XP002575821 Kyoto, Japan. Retrieved from the Internet: http://mi.eng.cam.ac.uk/~ad465/agispert/docs/papers/TP_gispert.pdf [retrieved on Mar. 30, 2010].

Planas, Emmanuel: "SIMILIS Second-generation translation memory software," Translating and the Computer 27, Nov. 2005 [London: Aslib, 2005].

Web Page—New Auction Art Preview, www.netauction.net/dragonart.html, "Come bid on original illustrations," by Greg & Tim Hidebrandt.

Web Pages—BidNet, www.bidnet.com, "Your link to the State and Local Government Market," including Bid Alert Service.

Web Pages—Christie's Art, www.christies.com, including "How to Buy," and "How to Sell."

Web Pages—Artrock Auction, www.commerce.com, Auction Gallery.

Notification of Reasons for Refusal for Japanese Application No. 2000-607125 mailed on Nov. 10, 2009 (Abstract Only).

Ross et al., U.S. Appl. No. 11/071,706, filed Mar. 3, 2005, Office Communication dated Dec. 13, 2007.

Ross et al., U.S. Appl. No. 11/071,706, filed Mar. 3, 2005, Office Communication dated Oct. 6, 2008.

Ross et al., U.S. Appl. No. 11/071,706, filed Mar. 3, 2005, Office Communication dated Jun. 9, 2009.

Ross et al., U.S. Appl. No. 11/071,706, filed Mar. 3, 2005, Office Communication dated Feb. 18, 2010.

Colucci, Office Communication for U.S. Appl. No. 11/071,706 dated Sep. 24, 2010.

Och, et al., "Improved Alignment Models for Statistical Machine Translation," In: Proceedings of the Joint Workshop on Empirical Methods in NLP and Very Large Corporations, 1999, p. 20-28, downloaded from http://www.actweb.org/anthology-new/W/W99/W99-0604.pdf.

International Search Report and Written Opinion dated Sep. 4, 2007 in Application No. PCT/US06/17398.

(56) References Cited

OTHER PUBLICATIONS

XP 002112717—Machine translation software for the Internet, Harada K.; et al, vol. 28, Nr:2, pp. 66-74. Sanyo Technical Review—San'yo Denki Giho, Oct. 1, 1996 Hirakata, JP—ISSN 0285-516X.
XP 000033460—Method to Make a Translated Text File Have the Same Printer Control Tags as the Original Text File, vol. 32, Nr:2, pp. 375-377, IBM Technical Disclosure Bulletin, Jul. 1, 1989 International Business Machines Corp. (Thornwood), US—ISSN 0018-8689.
XP 002565038—Integrating Machine Translation into Translation Memory Systems, Matthias Heyn, pp. 113-126, TKE. Terminology and Knowledge Engineering. Proceedingsinternational Congress on Terminology and Knowledge Engineering, Aug. 29, 1996; Aug. 29, 1996-Aug. 30, 1996 XX, XX.
XP 002565039—Linking translation memories with example-based machine translation, Michael Carl; Silvia Hansen, pp. 617-624, Machine Translation Summit. Proceedings, Sep. 1, 1999.
XP 55024828—TransType2—An Innovative Computer-Assisted Translation System, ACL 2004, Jul. 21, 2004, Retrieved from the Internet: :http://www.mt-archive.info/ACL-2004-Esteban.pdf [retrieved on Apr. 18, 2012].
Bourigault, Surface Grammatical Analysis for the Extraction of Terminological Noun Phrases, Proc. of Coling-92, Aug. 23, 1992, pp. 977-981, Nantes, France.
Thurmair, Making Term Extraction Tools Usable, The Joint Conference of the 8th International Workshop of the European Association for Machine Translation, May 15, 2003, Dublin, Ireland.
Sanfillipo, Section 5.2 Multiword Recognition and Extraction, Eagles LE3-4244, Preliminary Recommendations on Lexical Semantic Encoding, Jan. 7, 1999.
Hindle et al., Structural Ambiguity and lexical Relations, 1993, Association for Computational Linguistics, vol. 19, No. 1, pp. 103-120.
Ratnaparkhi, A Maximum Entropy Model for Part-Of-Speech Tagging, 1996, Proceedings for the conference on empirical methods in natural language processing, V.1, pp. 133-142.
Trados Translator's Workbench for Windows, 1994-1995, Trados GbmH, Stuttgart, Germany, pp. 9-13 and 27-96.
Somers, H. "Review Article: Example-based Machine Translation," Machine Translation, Issue 14, pp. 113-157, 1999.
Civera, et al. "Computer-Assisted Translation Tool Based on Finite-State Technology," In: Proc. of EAMT, 2006, pp. 33-40 (2006).
Okura, Seiji, "Translation Assistance by Autocomplete," The Association for Natural Language Processing, Publication 13th Annual Meeting, Mar. 2007, p. 678-679.
Soricut, R, et al., "Using a Large Monolingual Corpus to Improve Translation Accuracy," Proc. of the Conference of the Association for Machine Translation in the Americas (Amta-2002), Aug. 10, 2002, pp. 155-164, XP002275656.
Fung et al. "An IR Approach for Translating New Words from Non-parallel, Comparable Texts," Proceeding COLING '998 Proceedings of the 17th International Conference on Computational Lingiustics, 1998.
First Office Action mailed Dec. 26, 2008 in Chinese Patent Application 200580027102.1, filed Aug. 11, 2005.
Second Office Action mailed Aug. 28, 2009 in Chinese Patent Application 200580027102.1, filed Aug. 11, 2005.
Third Office Action mailed Apr. 28, 2010 in Chinese Patent Application 200580027102.1, filed Aug. 11, 2005.
Summons to attend oral proceeding pursuant to Rule 115(1)(EPC) mailed Mar. 20, 2012 in European Patent Application 05772051.8 filed Aug. 11, 2005.
Notification of Reasons for Rejection mailed Jan. 9, 2007 for Japanese Patent Application 2000-547557, filed Apr. 30, 1999.
Decision of Rejection mailed Jul. 3, 2007 for Japanese Patent Application 2000-547557, filed Apr. 30, 1999.
Extended European Search Report and Written Opinion mailed Jan. 26, 2011 for European Patent Application 10189145.5, filed on Oct. 27, 2010.
Notice of Reasons for Rejection mailed Jun. 26, 2012 for Japanese Patent Application P2009-246729. filed Oct. 27, 2009.
Search Report mailed Jan. 22, 2010 for United Kingdoms Application GB0918765.9, filed Oct. 27, 2009.
Notice of Reasons for Rejection mailed Mar. 30, 2010 for Japanese Patent Application 2007-282902. filed Apr. 30, 1999.
Decision of Rejection mailed Mar. 15, 2011 for Japanese Patent Application 2007-282902, filed Apr. 30, 1999.
First Office Action mailed Oct. 18, 2011 for Chinese Patent Application 2009102531926, filed Dec. 14, 2009.
Second Office Action mailed Aug. 14, 2012 for Chinese Patent Application 2009102531926, filed Dec. 14, 2009.
European Search Report mailed Apr. 12, 2010 for European Patent Application 09179150.9, filed Dec. 14, 2009.
First Examination Report mailed Jun. 16, 2011 for European Patent Application 09179150.9, filed Dec. 14, 2009.
Notice of Reasons for Rejection mailed Jul. 31, 2012 for Japanese Patent Application 2010-045531, filed Mar. 2, 2010.
First Examination Report mailed Oct. 26, 2012 for United Kingdom Patent Application GB0903418.2, filed Mar. 2, 2009.
First Office Action mailed Jun. 19, 2009 for Chinese Patent Application 200680015388.6, filed May 8, 2006.
First Examination Report mailed Nov. 26, 2009 for European Patent Application 05772051.8, filed May 8, 2006.
Second Examination Report mailed Feb. 19, 2013 for European Patent Application 06759147.9, filed May 8, 2006.
Langlais, et al. "TransType: a Computer-Aided Translation Typing System", in Conference on Language Resources and Evaluation, 2000.
First Notice of Reasons for Rejection mailed Jun. 18, 2013 for Japanese Patent Application 2009-246729, filed Oct. 27, 2009.
First Notice of Reasons for Rejection mailed Jun. 4, 2013 for Japanese Patent Application 2010-045531, filed Oct. 27, 2009.
Rejection Decision mailed May 14, 2013 for Chinese Patent Application 200910253192.6, filed Dec. 14, 2009.
Matsunaga, et al. "Sentence Matching Algorithm of Revised Documents with Considering Context Information," IEICE Technical Report, 2003.
Notice of Allowance mailed Jan. 7, 2014 for Japanese Patent Application 2009-246729, filed Oct. 27, 2009.
Final Rejection and a Decision to Dismiss the Amendment mailed Jan. 7, 2014 for Japanese Patent Application 2010-045531, filed Mar. 2, 2010.
Kumano et al., "Japanese-English Translation Selection Using Vector Space Model," Journal of Natural Language Processing; vol. 10; No. 3; (2003); pp. 39-59.
Office Action mailed Feb. 24, 2014 for Chinese Patent Application No. 201010521841.9, filed Oct. 25, 2010.
Pennington, Paula K. Improving Quality in Translation Through an Awareness of Process and Self-Editing Skills. Eastern Michigan University, ProQuest, UMI Dissertations Publishing, 1994.
Summons to attend oral proceeding pursuant to Rule 115(1)(EPC) mailed Feb. 3, 2015 in European Patent Application 06759147.9 filed May 8, 2006.
Decision to Refuse mailed Mar. 2, 2015 in European Patent Application 00902634.5 filed Jan. 26, 2000.
Non-Final Office Action, mailed May 19, 2014, U.S. Appl. No. 13/007,445, filed Jan. 14, 2011.
Final Office Action, mailed Jan. 20, 2015, U.S. Appl. No. 13/007,445, filed Jan. 14, 2011.
Non-Final Office Action, mailed Oct. 8, 2014, U.S. Appl. No. 12/477,708, filed Jun. 3, 2009.
Final Office Action, mailed Jun. 24, 2014, U.S. Appl. 12/636,970, filed Dec. 14, 2009.
Notice of Allowance, mailed Aug. 29, 2014, U.S. Appl. No. 12/636,970, filed Dec. 14, 2009.
Final Office Action, mailed Aug. 14, 2014, U.S. Appl. No. 13/052,041, filed Mar. 18, 2011.
Non-Final Office Action, mailed Mar. 26, 2015, U.S. Appl. No. 13/052,041, filed Mar. 18, 2011.
Notice of Allowance, mailed Jun. 19, 2014, U.S. Appl. No. 13/175,783, filed Jul. 1, 2011.
Corrected Notice of Allowability, mailed Sep. 22, 2014, U.S. Appl. No. 13/175,783, filed Jul. 1, 2011.

(56) References Cited

OTHER PUBLICATIONS

Non-Final Office Action, mailed Oct. 9, 2013, U.S. Appl. No. 13/951,451, filed Jul. 25, 2013.
Final Office Action, mailed Jun. 23, 2014, U.S. Appl. No. 13/951,451, filed Jul. 25, 2013.
Non-Final Office Action, mailed Dec. 1, 2014, U.S. Appl. No. 13/951,451, filed Jul. 25, 2013.
Final Office Action, mailed Mar. 11, 2015, U.S. Appl. No. 13/951,451, filed Jul. 25, 2013.
Non-Final Office Action, mailed Mar. 31, 2015, U.S. Appl. No. 13/951,451, filed Jul. 25, 2013.
Final Office Action, mailed May 21, 2014, U.S. Appl. No. 14/019,493, filed Sep. 5, 2013.
Advisory Action, mailed Jul. 8, 2014, U.S. Appl. No. 14/019,493, filed Sep. 5, 2013.
Non-Final Office Action, mailed Dec. 1, 2014, U.S. Appl. No. 14/019,493, filed Sep. 5, 2013.
Final Office Action, mailed Jun. 24, 2014, U.S. Appl. No. 14/019,480, filed Sep. 5, 2013.
Notice of Allowance, mailed Sep. 3, 2014, U.S. Appl. No. 14/019,480, filed Sep. 5, 2013.
Non-Final Office Action, mailed Apr. 1, 2015, U.S. Appl. No. 14/519,077, filed Oct. 20, 2014.

* cited by examiner

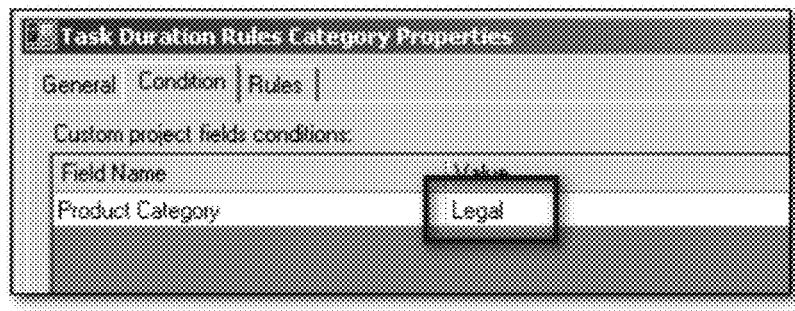
FIG. 7
FIG. 8
FIG. 9

SYSTEMS AND METHODS FOR AUTOMATICALLY ESTIMATING A TRANSLATION TIME INCLUDING PREPARATION TIME IN ADDITION TO THE TRANSLATION ITSELF

BACKGROUND

1. Field of the Invention

This application relates generally to data processing and, more specifically, to systems and methods for automatically estimating a translation time.

2. Description of Prior Art

Pioneered in the 1950s, computer-aided translation has been a rapidly growing field. There are two types of machine translation systems: rules-based and statistical. Introduction of statistical methods has led to better translations, handling differences in linguistic typology, translation of idioms, and the isolation of anomalies. Furthermore, computer-aided translation software allows for customization by domain or profession, thereby improving output by limiting the scope of allowable substitutions. However, computer-aided translation systems are able to translate more accurately when human translators supervise the process and update translation dictionaries. This human intervention leads to improved translation quality through automation with repeatable processes and reduced manual errors.

Modern language industry has developed following the availability of the Internet. Achievements of the industry include the ability to quickly translate long texts into many languages. However, managing translation services may be a difficult task and require simultaneously controlling complex projects with hundreds of translation tasks. An accurate estimate of the time required to perform a translation task is important for resource allocations.

SUMMARY OF THE INVENTION

The present technology may automatically estimate the time required to perform a translation by a translation service. To generate the estimate, the system may receive content, such as a web page or other digital content, having words in a source language, the content to be translated into a target language. The systems and methods may dynamically estimate the time required to perform the translation of the content from the source language to the target language. The estimate of the translation time may be based on factors such as a number of words and/or pages that comprise the content, a band percentage, and a type and/or subject matter of the content. The "band percentage" may be the percentage of content that is recognized in the source language as previously translated. For example, a time estimate will be faster if 99% of the content is comprised of previously translated sentences compared to if only 75% of the sentences have been previously translated.

In an embodiment, a system for automatically estimating a translation time comprises a communication module to receive translation data and to retrieve one or more pre-determined translation coefficients associated with one or more translation parameters. The system also includes a processing module to determine the one or more translation parameters based on the translation data and to calculate an estimated translation time based on the one more or more translation parameters and the one or more pre-determined translation coefficients. The system may further comprise a reporting module to report the estimated translation time to a user, wherein the communication module is to receive, from the user, a request to perform a translation associated with the translation data, a translation module to perform the translation, a time recording module to record an actual translation time, a comparing module to compare the actual translation time to the estimated translation time, and a coefficient adjusting module to revise the one or more pre-determined translation coefficients based on the comparison.

In an embodiment, the translation is a computer-aided translation and the one or more translation parameters include one or more of the following: a base task time, a target language, a category of the translation source, a number of words in the translation source, a number of pages in the translation source, and a band percentage. The band percentage is a percentage of translation units in the translation source that are matched in the translation memory. The translation units include one or more of the following: words, sentences, and phrases. The translation data includes one or more of the following: a source file, a translation memory, a suggestion dictionary, and a reference file. A value of a translation coefficient is based on the historical importance of a translation parameter associated with the translation coefficient in calculating the estimated translation time.

In embodiments, steps of methods counterpart to the systems described herein may be stored on a computer readable storage medium having a program embodied thereon, with the program executable by a processor in a computing device. In yet further example embodiments, modules, subsystems, or devices can be adapted to perform the recited steps. Other features and example embodiments are described below.

BRIEF DESCRIPTION OF THE DRAWINGS

Example embodiments are illustrated by way of example and not limitation in the figures of the accompanying drawings, in which like references indicate similar elements.

Figures 10, 11:
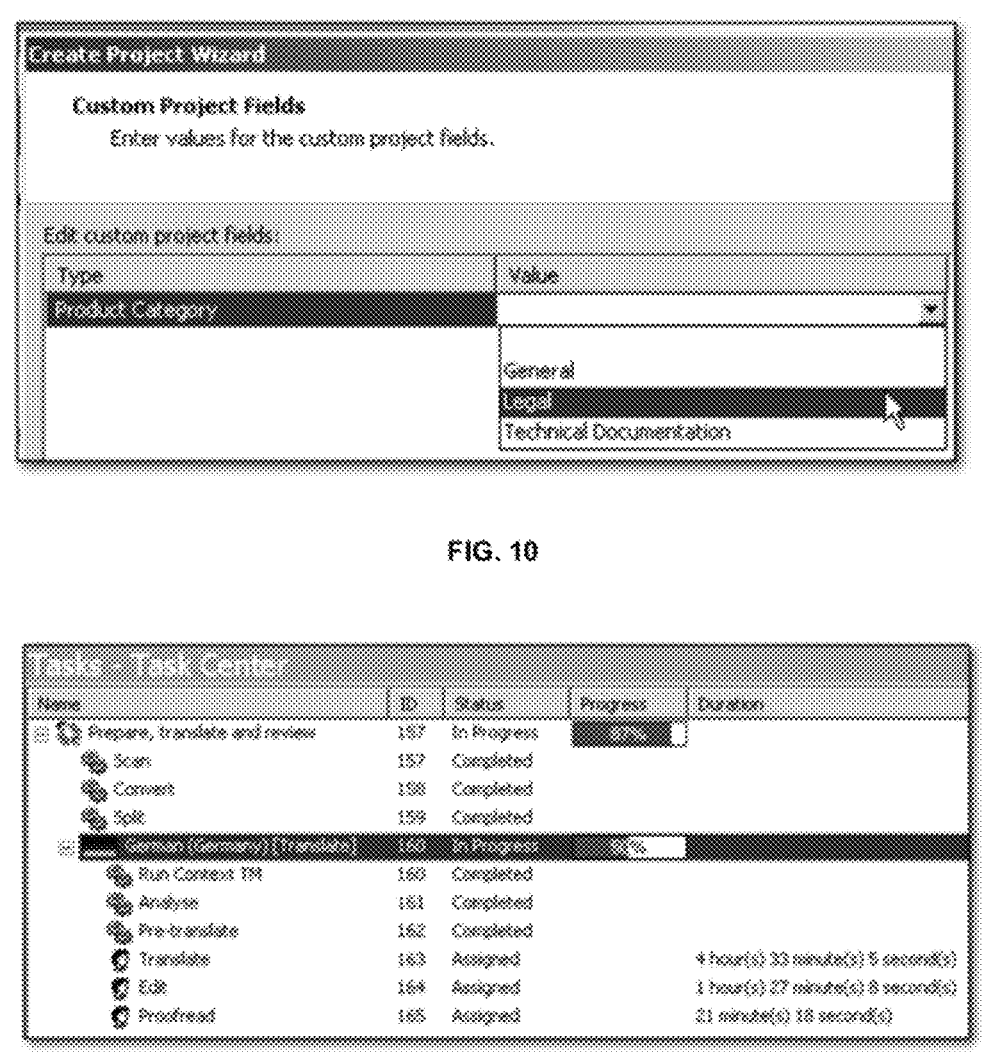

FIGS. 5-14 are screen shots of an interface though which the translation may be performed, in accordance with an example embodiment.

DETAILED DESCRIPTION

Figure 1:
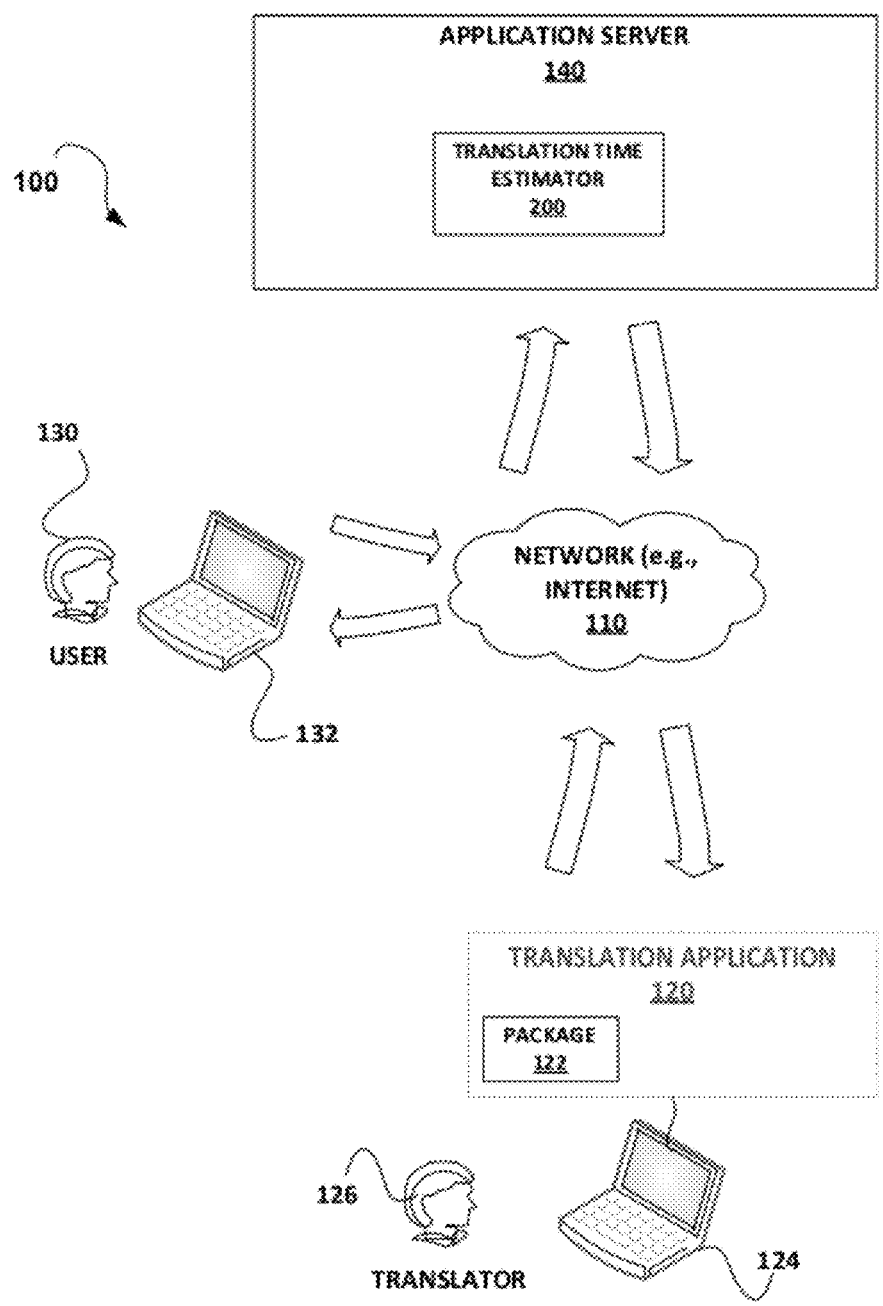
FIG. 1 is a block diagram of a network environment within which systems and methods for automatically estimating a translation time are implemented, in accordance with an example embodiment.

In one example embodiment, systems and methods for automatically estimating a translation time may receive content, such as a web page or other digital content, with words in a source language and translate the content into a target language. To generate the time estimate, the system may receive content, such as a web page or other digital content, having words in a source language, the content to be translated into a target language. The systems and methods may dynamically estimate the time required to perform the translation of the content from the source language to the target language. The estimate of the translation time may be based on factors such as a number of words and/or pages that comprise the content, a band percentage, and a type and/or subject matter of the content. The "band percentage" is the percentage of content that is recognized in the source language as previously translated. For example, a time estimate will be faster if 99% of the content is comprised of previously translated sentences compared to if only 75% of the sentences have been previously translated.

The type (e.g., subject matter) of the content may affect the estimation time; for example, pharmaceutical subject matter may take longer to translate than travel subject matter. After each translation, an algorithm utilized to estimate the translation time is updated based on the actual translation time for the combination of words, pages, band percentage and subject matter, and the updated algorithm is applied to subsequent translation jobs to improve the estimate.

For example, an initial translation time algorithm may be expressed as:

$$\text{Translation time} = F1(\text{word count, band percentage, content type}) * C, \quad \text{Eq. 1}$$

C may be a coefficient, for example a coefficient used as a weighting value that corresponds to the particular combination of word count, band percentage, or content type, respectively. Hence, the base time may be based on the word count, but may be adjusted based on a coefficient associated with the band percentage and/or by another coefficient associated with the content type. Values for coefficients may be stored in a database and retrieved based on the type of work. Other algorithms to determine the translation time may be used as well.

An example workflow of a method for automatically estimating a translation time may include receiving a content translation request by translation service from a user, retrieving translation coefficient values based on parameters of the translation request, calculating an estimated time for translation based on the coefficients, and reporting the estimated time for translation to the user. If the user accepts the estimate, the translation may be performed (by human translator or automated translation service) and the actual translation time recorded. If the actual translation time is within the estimated translation time, no adjustment is required. If, on the other hand, the actual translation time is not within the estimated translated time, one or more coefficients are adjusted to reflect the actual translation time.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

FIG. 1 is a block diagram of a network environment 100 within which systems and methods for automatically estimating a translation time may be implemented, in accordance with an example embodiment. As shown in FIG. 1, the network environment 100 may include a network (e.g., may include one or more of a wide area network, local area network, public network, private network, intranet, the Internet, or a combination of these) 110, a translation application 120, a translation package 122, computer 124 associated with a translator 126, computer 132 associated with a user 130, an application server 140, and a translation time estimator 200. The network 110 may include data processing nodes interconnected for the purpose of data communication and may communicatively couple various modules depicted in FIG. 1.

The systems and methods for automatically estimating a translation time may be implemented within the web-based network environment 100. Therefore, the user computer 132 may communicate to the application server 140 via the network 110. The translation time estimator 200 of the application server 140 may perform the business logic of the general workflow steps of the example methods. The application server 140 may provide the translation to the human translator 126 and receive the finished product when ready.

Figure 2:
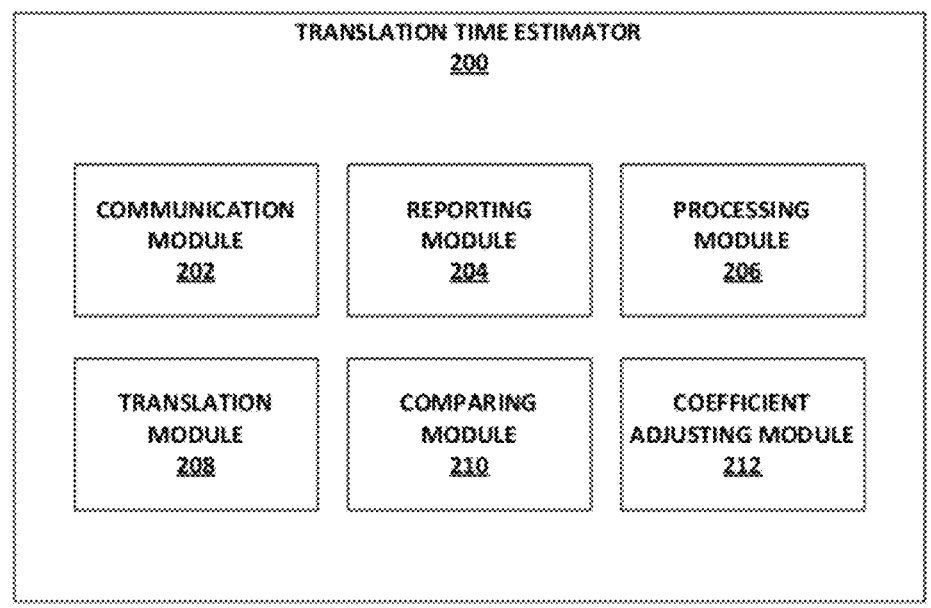
FIG. 2 is a block diagram of a translation time estimator, in accordance with an example embodiment.

FIG. 2 is a block diagram of a translation time estimator 200, in accordance with an example embodiment. Alternative embodiments of the translation time estimator 200 may comprise more, less, or functionally equivalent modules. In some example embodiments, the translation time estimator 200 may comprise a communication module 202, a reporting module 204, a processing module 206, a translation module 208, a comparing module 210, and a coefficient (coefficient) adjusting module 212.

It will be appreciated by one of ordinary skill that examples of the foregoing modules may be virtual, and instructions said to be executed by a module may, in fact, be retrieved and executed by a processor. The foregoing modules may also include memory cards, servers, and/or computer discs. Although various modules may be configured to perform some or all of the various steps described herein, fewer or more modules may be provided and still fall within the scope of various embodiments.

The communication module 202 may, in some embodiments, receive translation data from the user 130. Translation parameters may be determined based on the translation data. Some translation parameters may be determined directly from the translation data provided from a user, such as a desired task time, the target language, and a category of the translation source. Other translation parameters may be determined by processing the translation data, such as a number of words in the translation source, and a number of pages in the translation source, and a band percentage. Once the translation parameters are determined, the communication module 202 may retrieve translation coefficients associated with a set of translation parameters such as, for example, a base task time, a target language, a category of the translation source, a number of words in the translation source, a number of pages in the translation source, and a band percentage. The translation coefficient(s) may be used as coefficients or weightings in a translation time algorithm, and may be generated from previous translations performed for the same set of translations. For example, for a translation of medical journal content translated from English to German, three previous translations may average ten minutes per page. A subsequent translation request from English to German of six pages of medical journal content may have an estimate of sixty minutes. The processing module 206 may then calculate an estimated translation time based on the translation parameters and translation coefficients retrieved by the communication module 202. Once the processing module 206 calculates the estimated translation time, the reporting module 204 may report the estimated translation time to the user 130. If the user 130 accepts the translation estimate, the translation module 208 may perform the translation.

Upon completion of the translation, the actual translation time may be recorded and the comparing module 210 may compare the actual time to the estimated time of translation. Based on the comparison, the coefficient adjusting module 212 may revise the translation coefficients to improve future estimates. Alternatively, an average time per translation page or word for translation jobs having the same parameters of source language, target language, and content subject matter may be updated based on the recent translation results with matching parameters.

Accurate estimates of the translation time are important for assessing how much time it will take to do this particular translation so that the work can be allocated to an appropriate translator. This is especially important in the case of multiple simultaneous projects. The approach described herein allows performing an analysis based on the percentage of the content being previously translated, the word count, page count, and other parameters associated with the source file. Once the project is completed, the actual time to complete the translation may be manually recorded and compared to the estimated time. For example, estimated and actual values can be placed in two columns next to each other and the times compared. With time, the estimates can be refined, and eventually the estimates get better, thereby creating a reliable way of planning the translation work that keeps coming in. Thus, rather than doing the estimates manually, they are performed automatically.

Besides the word count parameter, other parameters may include page count and word count. The word count may be split into different match bands, with the match band being the percentage of the likelihood of the translation being correct. For example, if there is an exact match, then the match band is 100%, no intervention by a human translator is required, and the translation is nearly instantaneous. If there are minor differences (for example, the match band is 95%), some minor interventions by a human translator are necessary but still the effort to correct the translation is minimal. As the match band increases, the situation may get worse and worse to the point where a human translator may spend less time by translating the source document from scratch instead of taking suggestions from the translation memory. The translation memory includes a set of words and sentences that have been previously translated. Different match bands are calculated based on whether a particular sentence has been previously translated. The system may associate a different amount time per each word of the source document in each match band.

Additionally, the parameters may include the particular type of work; for example, if the type of work is legal translation, it might take longer than it would take for a marketing translation of the same size. A user may use special portals to provide the translation data in order to receive an estimated time to translate.

Figure 3:
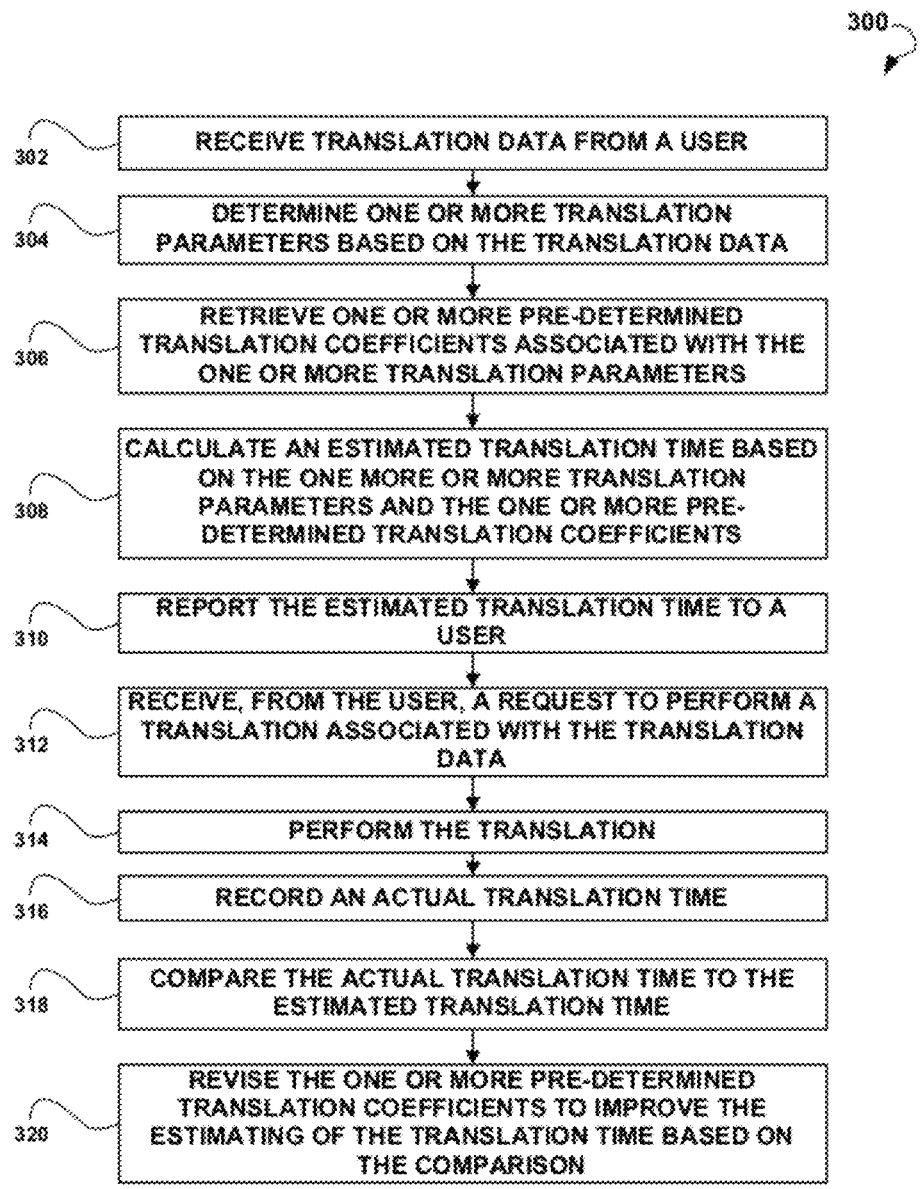
FIG. 3 is a workflow diagram of a method for automatically estimating a translation time, in accordance with an example embodiment.

FIG. 3 is a workflow diagram of a method 300 for sharing content, in accordance with an example embodiment. The method 300 may be performed by processing logic that may comprise hardware (e.g., dedicated logic, programmable logic, microcode, etc.), software (such as run on a general-purpose computer system or a dedicated machine), or a combination of both. In one example embodiment, at least a portion of the processing logic may reside at the translation time estimator 200, as illustrated in FIG. 2.

As shown in FIG. 3, the method 300 may commence at operation 302 with the communication module 202 of the translation time estimator 200 receiving translation data from a user. Based on the translation data received from the user, the processing module 206 may determine one or more translation parameters to be used in calculating the estimated time to complete the translation at operation 304. At operation 306, the processing module 206 may retrieve translation coefficients associated with the translation parameters. At operation 308, the processing module 206 may calculate an estimated translation time based on the translation parameters and the translation coefficients.

Once the estimated translation time is completed, the reporting module 204 may report the estimated translation time to the user at operation 310. If the user would like to proceed with the service, the user may request a translation associated with the translation data be performed at operation 312. At operation 314, the translation module 208 may perform the translation. The actual translation time can be recorded at operation 316. At operation 318, the comparing module 210 compares the actual translation time to the estimated translation time. Based on the comparison performed by the comparing module 210, the coefficient adjusting module 212 may revise the translation coefficients at operation 320.

Figure 4:
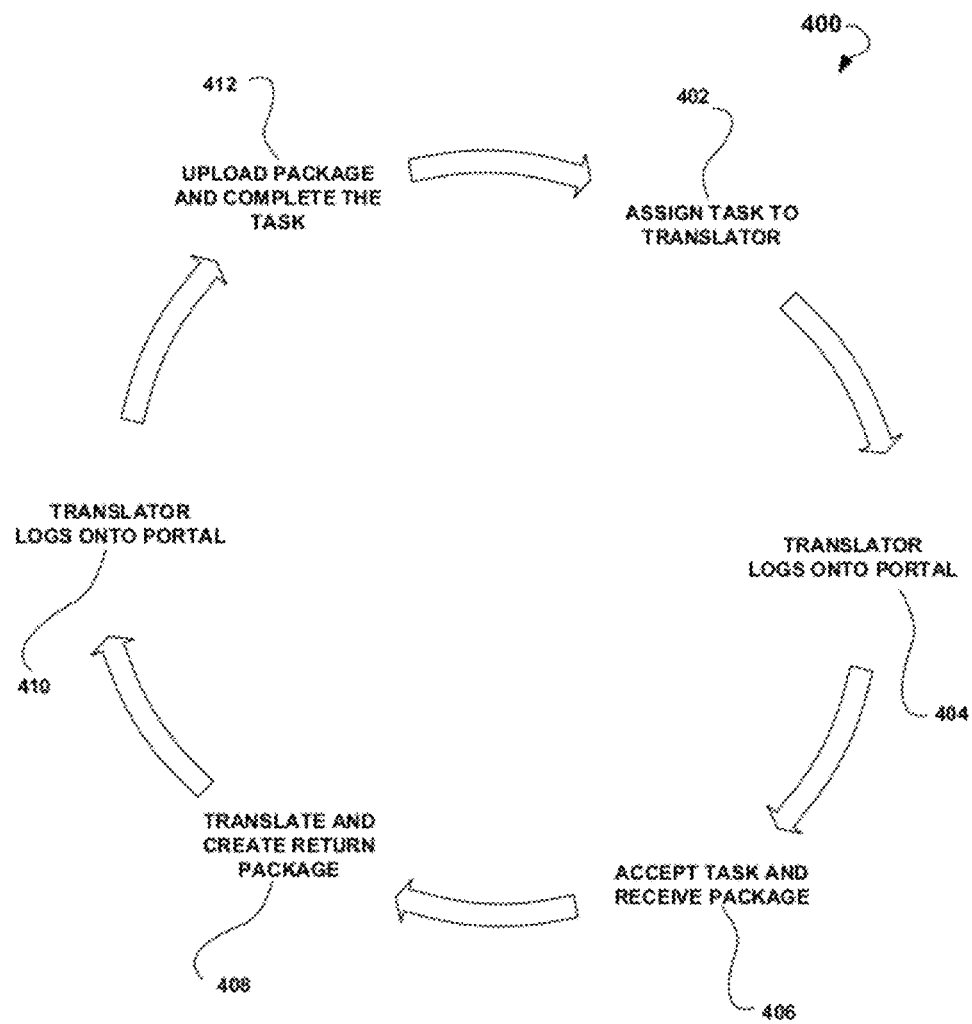
FIG. 4 is a workflow diagram of a method for translating a document, in accordance with an example embodiment.
Figure 5:
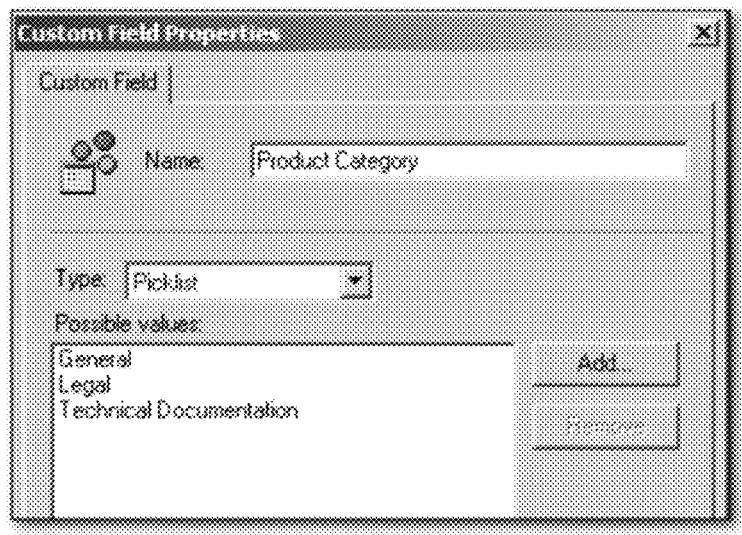
Figure 6:
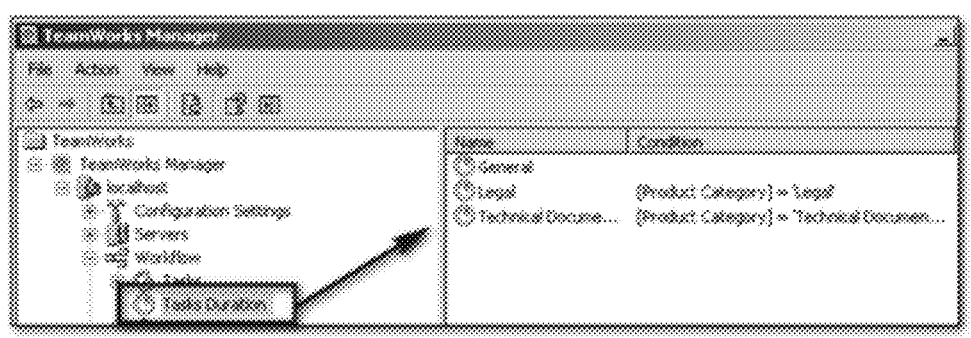
Figure 12:
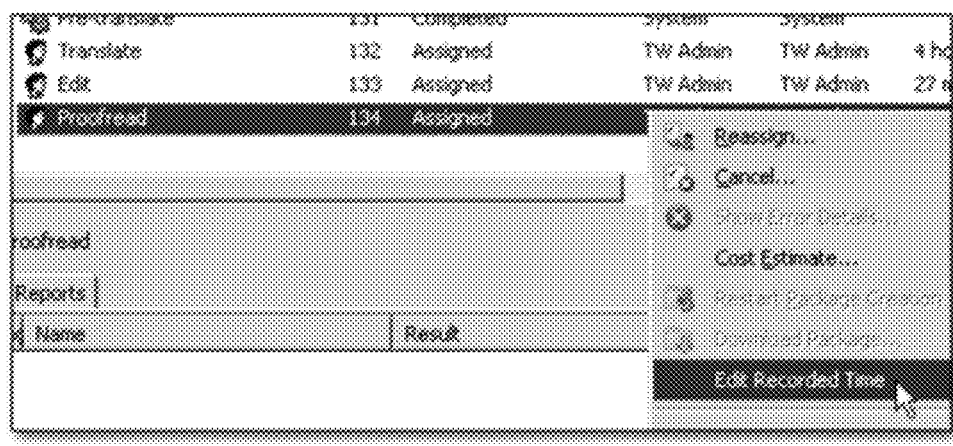
Figure 13:
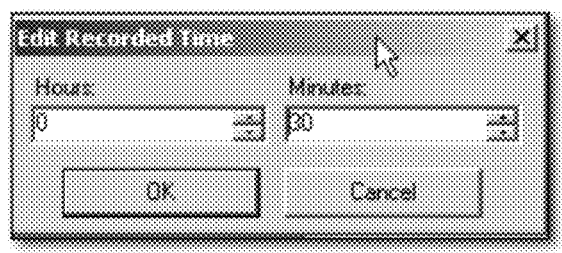
Figure 14:
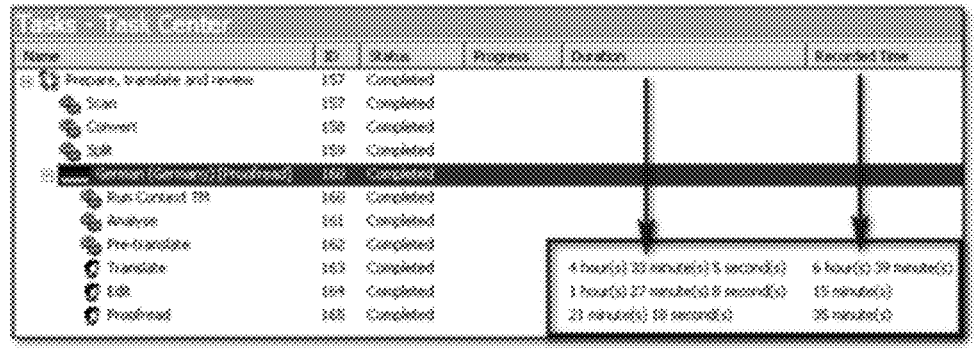

FIG. 4 is a diagram of a method 400 for translating a document, in accordance with an example embodiment. The method 400 may be performed by processing logic that may comprise hardware (e.g., dedicated logic, programmable logic, microcode, etc.), software (such as run on a general-purpose computer system or a dedicated machine), or a combination of both. In one example embodiment, the processing logic resides at the translation time estimator 200, as illustrated in FIG. 2.

The method 400 may be performed by the various modules discussed above with reference to FIG. 2. Each of these modules may comprise processing logic. The method illustrates a work cycle as a round-trip from receiving the assignment to uploading the completed package. The method 400 may commence at operation 402 as a task being assigned to a translator. The translator may log onto the portal at operation 404, accept the task, and receive the package at operation 406. At operation 408, the translator may complete the translation. At operation 410, the translator may log onto the portal and may then upload the package and complete the task at operation 412.

FIG. 5-14 show screenshots of a user interface to a software functionality that may be utilized to provide translation time estimates based on the analysis described above. The user may start by setting up different categories identified by a custom field and whichever tasks are used in that category. An estimated task duration may be displayed in hours, in a column against a relevant task. The basis of this calculation may change through the cost calculator on the fly and may compare the actual time against the estimated to help with refining future planning. A user may decide which types of work are relevant for his or her work and then create a custom field with pick list values relevant to the types of work. In this example, three types of work have been created: general translation work, legal translation work, and technical documentation. These are all added to a custom field named Product Category.

Different categories may mirror the values in the pick list that were added to the product category. The general category is a default category and may be used if none of the others are specified when creating the project. Conditions may be defined under which each set of tasks duration rules will be used. Referring to the legal category, the value "legal" can be added from the pick list presented. The rules may be set manually. There may be no default values provided so the administrator needs to agree as to what values to use for each type of work and how quickly, for example in seconds, they can be carried out for each task.

Various parameters that may be utilized to calculate time. The parameters may include a task type, such as translate, edit, proofread, correct errors, review comments, and task time. The task time is to provide a base time that can be used for additional time to prepare for work in addition to the act of translating itself, or as a base value to be used where the task is not based on the size of the document or number of words, for example. Thus, for example, the administrator could create a new rule for a review task where the only value populated is a task time of 1800 seconds and zero in every other column.

Match bands are an average time per word that it would take to complete the task based on a fixed amount of time per word per match value in the following example bands: Context TM, Repetitions, 100%, 95-99%, 85-94%, 75-84%, 50-74%, No Match. Once the analysis is complete, the duration column may be populated with an estimate of how long the work is expected to take, which enables the project manager to plan resources accordingly. Once the work is complete, the project manager can edit the recorded time for the task, allowing a useful feedback loop that can be used to refine the estimated values in the task duration rules for future planning. Then the two columns can be compared side by side and use the values for an instant comparison as well as in more detailed reporting. This may bring up the small dialog box where a revised number of hours can be manually entered.

Figure 15:
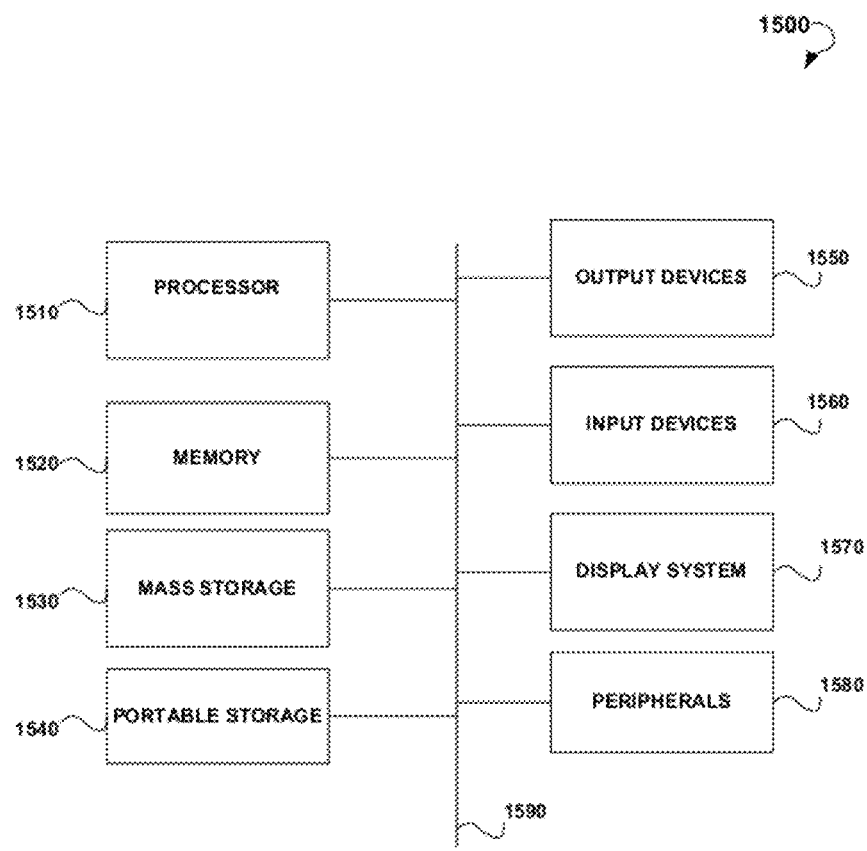
FIG. 15 is a computing system that may be used to implement the methods for automatically estimating a translation time, in accordance with an example embodiment.

FIG. 15 illustrates an example computing system 1500 that may be used to implement an embodiment of the present invention. System 1500 of FIG. 15 may be implemented in the context of the application server 140, the translation time estimator 200, the network 110, and the like. The computing system 1500 of FIG. 15 includes one or more processors 1510 and main memory 1520. Main memory 1520 stores, in part, instructions and data for execution by processor 1510. Main memory 1520 can store the executable code when the system 1500 is in operation. The system 1500 of FIG. 15 may further include a mass storage device 1530, portable storage medium drive(s) 1540, output devices 1550, user input devices 1560, a display system 1570, and other peripheral devices 1580.

The components shown in FIG. 15 are depicted as being connected via a single bus 1590. The components may be connected through one or more data transport means. Processor 1510 and main memory 1520 may be connected via a local microprocessor bus, and the mass storage device 1530, peripheral device(s) 1580, portable storage medium drive 1540, and display system 1570 may be connected via one or more input/output (I/O) buses.

Mass storage device 1530, which may be implemented with a magnetic disk drive or an optical disk drive, is a non-volatile storage device for storing data and instructions for use by processor 1510. Mass storage device 1530 can store the system software for implementing embodiments of the present invention for purposes of loading that software into main memory 1520.

Portable storage medium drive 1540 operates in conjunction with a portable non-volatile storage medium, such as a floppy disk, compact disk (CD) or digital video disc (DVD), to input and output data and code to and from the computer system 1500 of FIG. 15. The system software for implementing embodiments of the present invention may be stored on such a portable medium and input to the computer system 1500 via the portable storage medium drive 1540.

User input devices 1560 provide a portion of a user interface. User input devices 1560 may include an alphanumeric keypad, such as a keyboard, for inputting alphanumeric and other information, or a pointing device, such as a mouse, a trackball, stylus, or cursor direction keys. Additionally, the system 1500 as shown in FIG. 15 includes output devices 1550. Suitable output devices include speakers, printers, network interfaces, and monitors.

Display system 1570 may include a liquid crystal display (LCD) or other suitable display device. Display system 1570 receives textual and graphical information and processes the information for output to the display device.

Peripherals 1580 may include any type of computer support device to add additional functionality to the computer system. Peripheral device(s) 1580 may include a modem or a router.

The components contained in the computer system 1500 of FIG. 15 are those typically found in computer systems that may be suitable for use with embodiments of the present invention and are intended to represent a broad category of such computer components that are well known in the art. Thus, the computer system 1500 of FIG. 15 can be a personal computer (PC), hand held computing device, telephone, mobile computing device, workstation, server, minicomputer, mainframe computer, or any other computing device. The computer can also include different bus configurations, networked platforms, multi-processor platforms, and so forth. Various operating systems can be used, including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire, and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to the system RAM, from which a CPU retrieves and executes the instructions. The instructions received by the system RAM can optionally be stored on a fixed disk either before or after execution by a CPU.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents. While the present invention has been described in connection with a series of embodiments, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art. One skilled in the art will recognize that the Internet service may be configured to provide Internet access to one or more computing devices that are coupled to the Internet service, and that the computing devices may include one or more processors, buses, memory devices, display devices, I/O devices, and the like. Furthermore, those skilled in the art may appreciate that the Internet service may be coupled to one or more databases, repositories, servers, and the like, which may be utilized in order to implement any of the embodiments of the invention as described herein. One skilled in the art will further appreciate that the term "content" comprises one or more of web sites, domains, web pages, web addresses, hyperlinks, URLs, text, pictures, and/or media (such as video, audio, and any combination of audio and video) provided or displayed on a web page, and any combination thereof.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes, or steps may be deleted, moved, added, subdivided, combined, and/or modified to provide alternative or sub-combinations. Each of these processes or steps may be implemented in a variety of different ways. In addition, while processes or steps are at times shown as being performed in series, these processes or steps may instead be performed in parallel, or may be performed at different times.

From the foregoing, it will be appreciated that specific embodiments of the system have been described herein for purposes of illustration, but that various modifications may be made without deviating from the spirit and scope of the system. Accordingly, the system is not limited except as by the appended claims.

The invention claimed is:

1. A method for automatically estimating a translation time, the method comprising:
    receiving translation data including content to be translated;
    determining translation parameters based on the translation data, the translation parameters comprising a task time which provides a base time that is used for additional time to prepare for work in addition to actual translation itself, a band percentage that defines a recognized percentage of the content that has been previously translated, and a content type that defines a subject matter which is indicative of a complexity of the content;
    retrieving one or more pre-determined translation coefficients associated with at least one of the translation parameters, the estimated translation time calculated at least in part based on the one or more pre-determined translation coefficients; and
    executing a module by a processor, the module stored in memory, the executed module configured to calculate an estimated translation time for translating the content using the translation parameters and the one or more pre-determined translation coefficients.

2. The method of claim 1, further comprising:
    reporting the estimated translation time to a user;
    receiving, from the user, a request to perform a translation associated with the translation data;
    performing the translation;
    recording an actual translation time;
    comparing the actual translation time to the estimated translation time; and
    based on the comparison, revising the one or more pre-determined translation coefficients to improve the estimating of the translation time.

3. The method of claim 1, wherein the translation parameters include one or more of the following: a base task time, a target language, a number of words in a translation source, and a number of pages in the translation source.

4. The method of claim 1, wherein the translation data includes one or more of the following: a source file, a translation memory, a suggestion dictionary, and a reference file.

5. The method of claim 1, wherein a value of a translation coefficient is based on historical importance of a translation parameter associated with the translation coefficient in calculating of the estimated translation time.

6. The method according to claim 1, further comprising splitting a word count parameter into match bands, wherein each of the match bands is associated with a portion of the translation data, further wherein a match band comprises a likelihood that a translation of the portion of the translation data will be correct, the match band being expressed as a percentage.

7. A system for automatically estimating a translation time, the system comprising:
    a communication module stored in memory and executed by a processor to receive translation data including content to be translated and to retrieve one or more pre-determined translation coefficients associated with translation parameters, the translation parameters comprising a task time which provides a base time that is used for additional time to prepare for work in addition to actual translation itself, a band percentage that defines a recognized percentage of the content that has been previously translated, and a content type that defines a subject matter which is indicative of a complexity of the content; and
    a processing module stored in memory and executed by a processor to determine the translation parameters based on the translation data and to calculate an estimated translation time using the translation parameters and the one or more pre-determined translation coefficients.

8. The system of claim 7, further comprising:
    a reporting module to report the estimated translation time to a user, wherein the communication module is to receive, from the user, a request to perform a translation associated with the translation data;
    a translation module to perform the translation;
    a time recording module to record an actual translation time;
    a comparing module to compare the actual translation time to the estimated translation time; and
    a coefficient adjusting module to revise the one or more pre-determined translation coefficients based on the comparison.

9. The system of claim 7, wherein the translation is a computer-aided translation.

10. The system of claim 7, wherein the translation parameters include one or more of the following: a base task time, a target language, a number of words in a translation source, and a number of pages in the translation source.

11. The system of claim 7, wherein the translation data includes one or more of the following: a source file, a translation memory, a suggestion dictionary, and a reference file.

12. The system of claim 7, wherein a value of a translation coefficient is based on historical importance of a translation parameter associated with the translation coefficient in calculating of the estimated translation time.

13. A non-transitory computer readable storage medium having embodied thereon a program, the program being executable by a processor to perform a method for translating content, the method comprising:
   receiving translation data including content to be translated;
   determining translation parameters based on the translation data, the translation parameters comprising a task time which provides a base time that is used for additional time to prepare for work in addition to actual translation itself, a band percentage that defines a recognized percentage of the content that has been previously translated, and a content type that defines a subject matter which is indicative of a complexity of the content; and
   calculating an estimated translation time for translating the content using the translation parameters and one or more pre-determined translation coefficients.

14. The non-transitory computer readable storage medium of claim 13, further comprising:
   retrieving the one or more pre-determined translation coefficients associated with the translation parameters.

15. The non-transitory computer readable storage medium of claim 13, further comprising:
   reporting the estimated translation time to a user;
   receiving, from the user, a request to perform a translation associated with the translation data;
   performing the translation;
   recording an actual translation time;
   comparing the actual translation time to the estimated translation time; and
   based on the comparison, revising the one or more pre-determined translation coefficients to improve the estimating of the translation time.

16. The non-transitory computer readable storage medium of claim 13, wherein the translation parameters include one or more of the following: a base task time, a target language, a number of words in a translation source, and a number of pages in the translation source.

17. A method for automatically estimating a translation time, the method comprising:
   receiving translation data including content to be translated;
   determining translation parameters based on the translation data, the translation parameters comprising a task time which provides a base time that is used for additional time to prepare for work in addition to actual translation itself, a band percentage that defines a recognized percentage of the content that has been previously translated, and a content type that defines a subject matter which is indicative of a complexity of the content;
   splitting a word count parameter into match bands, wherein each of the match bands is associated with a portion of the translation data;
   retrieving one or more pre-determined translation coefficients associated with at least one of the translation parameters, the estimated translation time calculated at least in part based on the one or more pre-determined translation coefficients; and
   executing a module by a processor, the module stored in memory, the executed module configured to calculate an estimated translation time for translating the content using the translation parameters and the one or more pre-determined translation coefficients.

\* \* \* \* \*